(12) United States Patent
Chan

(10) Patent No.: US 9,381,968 B2
(45) Date of Patent: *Jul. 5, 2016

(54) SCOOTER

(71) Applicant: NICER HOLDINGS LIMITED, Mong Kok, Kowloon, Hong Kong (CN)

(72) Inventor: Yui Chan, Hong Kong (HK)

(73) Assignee: NICER HOLDINGS LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,276

(22) Filed: Mar. 23, 2015

(65) Prior Publication Data

US 2015/0197303 A1 Jul. 16, 2015

Related U.S. Application Data

(63) Continuation of application No. 13/570,238, filed on Aug. 8, 2012, now Pat. No. 8,985,602.

(51) Int. Cl.
*B62M 1/00* (2010.01)
*B62K 5/08* (2006.01)
*B62K 21/00* (2006.01)
*B62K 3/00* (2006.01)
*B62K 5/02* (2013.01)

(52) U.S. Cl.
CPC . *B62K 5/08* (2013.01); *B62K 3/002* (2013.01); *B62K 5/02* (2013.01); *B62K 21/005* (2013.01)

(58) Field of Classification Search
CPC ...... B62K 3/002; A63C 17/01; A63C 17/011; A63C 17/012
See application file for complete search history.

(56) References Cited

U.S. PATENT DOCUMENTS

| | | | | |
|---|---|---|---|---|
| 2,051,762 | A | * | 8/1936 | Vincent .................. 280/87.041 |
| 3,751,062 | A | * | 8/1973 | White, Sr. ............... 280/87.042 |
| 3,870,324 | A | | 3/1975 | Balstad |
| 4,061,351 | A | * | 12/1977 | Bangle ..................... 280/87.042 |
| 4,732,400 | A | * | 3/1988 | Santini ..................... 280/87.042 |
| 4,775,162 | A | * | 10/1988 | Chao ........................ 280/87.041 |
| 4,811,971 | A | * | 3/1989 | Phillips .................... 280/87.041 |
| 5,154,436 | A | * | 10/1992 | Jez et al. .................. 280/87.042 |
| 6,142,493 | A | * | 11/2000 | Wang et al. ............. 280/87.041 |
| 6,155,553 | A | * | 12/2000 | Wang et al. ............. 280/87.041 |
| 6,182,985 | B1 | * | 2/2001 | Wang et al. ............. 280/87.041 |

(Continued)

FOREIGN PATENT DOCUMENTS

| | | |
|---|---|---|
| CN | 1332024 A | 1/2002 |
| CN | 2581304 Y | 10/2003 |

(Continued)

OTHER PUBLICATIONS

EP12192984, European Search Report, Dec. 5, 2014.

*Primary Examiner* — Hau Phan
*Assistant Examiner* — Jacob Meyer
(74) *Attorney, Agent, or Firm* — Millman IP Inc.

(57) ABSTRACT

The scooter of the present invention includes a footboard having a front portion, and a rear portion attached to a rear wheel; a front wheel axle having an upward axis perpendicular with the front wheel axle and a steering axis, wherein the front wheel axle is rotatable with respect to the steering axis; and a plurality of front wheels attached to the front wheel axle. The steering axis forms a predetermined adjacent angle between 0 degree and 90 degree with respect to the upward axis.

4 Claims, 5 Drawing Sheets

(56) References Cited

U.S. PATENT DOCUMENTS

| | | | |
|---|---|---|---|
| 6,199,880 B1* | 3/2001 | Favorito et al. | 280/87.042 |
| 6,213,484 B1* | 4/2001 | Rohner | 280/87.042 |
| 6,279,930 B1* | 8/2001 | Chang et al. | 280/87.042 |
| 6,286,843 B1* | 9/2001 | Lin | 280/11.28 |
| 6,299,186 B1* | 10/2001 | Kao et al. | 280/87.041 |
| 6,315,304 B1* | 11/2001 | Kirkland et al. | 280/11.28 |
| 6,315,312 B1* | 11/2001 | Reyes et al. | 280/87.042 |
| 6,341,672 B1* | 1/2002 | Yang et al. | 188/20 |
| 6,382,646 B1* | 5/2002 | Shaw | 280/87.041 |
| 6,409,190 B1* | 6/2002 | Tsai | 280/87.041 |
| 6,409,191 B1* | 6/2002 | Wang et al. | 280/87.041 |
| D460,788 S | 7/2002 | Kwok | |
| 6,428,023 B2* | 8/2002 | Reyes et al. | 280/87.042 |
| 6,511,083 B1* | 1/2003 | Tsai | 280/87.041 |
| 6,520,516 B2 | 2/2003 | Favorito et al. | 280/87.042 |
| 6,520,517 B1* | 2/2003 | Chung et al. | 280/87.042 |
| 6,523,837 B2* | 2/2003 | Kirkland | 280/11.28 |
| D475,093 S | 5/2003 | Furter et al. | |
| 6,557,873 B2* | 5/2003 | Nardone | 280/87.042 |
| 6,758,789 B1* | 7/2004 | Wang et al. | 482/51 |
| 6,938,907 B2* | 9/2005 | Hamy | 280/87.042 |
| 7,083,177 B1* | 8/2006 | Chen | 280/87.041 |
| 7,121,566 B2* | 10/2006 | McClain | 280/87.042 |
| 7,219,907 B2* | 5/2007 | Chang | 280/87.042 |
| 7,226,081 B2* | 6/2007 | Chen | 280/771 |
| 7,243,931 B2* | 7/2007 | Chen | 280/87.042 |
| 7,303,199 B2* | 12/2007 | Chen | 280/87.041 |
| 7,314,223 B2* | 1/2008 | Lin | 280/87.042 |
| 7,316,408 B2* | 1/2008 | McClain | 280/87.042 |
| D564,037 S | 3/2008 | Cramer et al. | |
| 7,413,200 B2* | 8/2008 | Horn | 280/87.042 |
| 7,487,988 B2* | 2/2009 | Kettler et al. | 280/279 |
| 7,597,333 B2* | 10/2009 | Stillinger | 280/87.041 |
| D654,965 S | 2/2012 | Herlitz et al. | |
| 8,186,694 B2* | 5/2012 | Nelson et al. | 280/11.28 |
| 8,251,384 B1* | 8/2012 | Christensen et al. | 280/87.042 |
| D672,400 S | 12/2012 | Pizzi | |
| 8,632,084 B2* | 1/2014 | Lovley et al. | 280/87.041 |
| D698,868 S * | 2/2014 | Chan | D21/423 |
| 8,696,000 B1* | 4/2014 | Chen | 280/87.041 |
| 8,752,849 B1* | 6/2014 | Fox | 280/87.042 |
| 8,939,454 B2* | 1/2015 | Stillinger et al. | 280/87.041 |
| 2001/0038187 A1* | 11/2001 | Reyes et al. | 280/87.042 |
| 2002/0011713 A1* | 1/2002 | Kirkland | 280/11.28 |
| 2002/0084602 A1* | 7/2002 | Feng | 280/11.223 |
| 2002/0096846 A1 | 7/2002 | Chen | |
| 2002/0135147 A1* | 9/2002 | Lee | 280/87.041 |
| 2002/0167143 A1 | 11/2002 | Shaw | |
| 2002/0167144 A1* | 11/2002 | Guang-Gwo | 280/87.041 |
| 2002/0180169 A1* | 12/2002 | Kwok | 280/87.041 |
| 2003/0141689 A1* | 7/2003 | Hamy | 280/87.042 |
| 2003/0188906 A1* | 10/2003 | Bank | 180/210 |
| 2004/0100053 A1* | 5/2004 | Chen | 280/87.041 |
| 2004/0145142 A1* | 7/2004 | Wang | 280/87.042 |
| 2005/0012290 A1* | 1/2005 | McClain | 280/87.042 |
| 2005/0093262 A1 | 5/2005 | Chang | |
| 2005/0140108 A1* | 6/2005 | Chen | 280/87.041 |
| 2006/0192358 A1* | 8/2006 | Chen | 280/93.512 |
| 2006/0220336 A1* | 10/2006 | Lin | 280/87.042 |
| 2007/0035099 A1* | 2/2007 | Chen | 280/87.041 |
| 2007/0035102 A1* | 2/2007 | McClain | 280/87.042 |
| 2007/0096424 A1* | 5/2007 | Chen | 280/272 |
| 2007/0164530 A1* | 7/2007 | Horn | 280/87.042 |
| 2007/0235970 A1* | 10/2007 | Stillinger | 280/87.041 |
| 2009/0273152 A1* | 11/2009 | Chung | 280/87.042 |
| 2010/0001484 A1* | 1/2010 | Cole | 280/87.042 |
| 2010/0059956 A1* | 3/2010 | Stillinger | 280/87.041 |
| 2010/0123295 A1* | 5/2010 | Landau | 280/87.042 |
| 2010/0327546 A1* | 12/2010 | Nelson et al. | 280/87.042 |
| 2011/0042913 A1* | 2/2011 | Landau | 280/87.042 |
| 2011/0227305 A1* | 9/2011 | Chen | 280/87.01 |
| 2012/0018967 A1 | 1/2012 | Chen | |
| 2012/0181773 A1* | 7/2012 | Ouboter | 280/263 |
| 2013/0001909 A1* | 1/2013 | Stillinger et al. | 280/87.041 |
| 2013/0175790 A1* | 7/2013 | Wurst | 280/639 |
| 2013/0307240 A1* | 11/2013 | Petutschnig | 280/87.042 |
| 2014/0042717 A1 | 2/2014 | Chan | |

FOREIGN PATENT DOCUMENTS

| | | |
|---|---|---|
| CN | 2608405 Y | 3/2004 |
| CN | 201254251 Y | 6/2006 |
| DE | 102012007780 B3 | 8/2013 |
| FR | 2564411 A1 | 11/1985 |
| TW | 472731 U | 1/2002 |

* cited by examiner

SCOOTER

CROSS-REFERENCES TO OTHER APPLICATIONS

This application is a continuation of U.S. patent application Ser. No. 13/570,238, filed on Aug. 8, 2012, now allowed, the entire contents of which are incorporated by reference.

FIELD OF THE INVENTION

The present invention relates to a scooter, in particular, a scooter without a handle for steering.

BACKGROUND

There are numerous scooters in the market which require a steering handle to turn the scooter. The user has to use his hands to steer the handle in order to turn the wheels of the scooter. It will be more convenient and entertaining if the user can turn the scooter without using his hands to physically turn the steering handle, but simply by banking the scooter to one side.

It is an objective of the present invention to provide an improved scooter without a steering handle for turning the scooter.

SUMMARY

An object of the present invention is to provide a scooter which can be steered by the user simply by banking the scooter to one side.

The scooter of the present invention includes a footboard having a front portion, and a rear portion attached to a rear wheel; a front wheel axle having an upward axis perpendicular with the front wheel axle and a steering axis, wherein the front wheel axle is rotatable with respect to the steering axis; and a plurality of front wheels attached to the front wheel axle. The steering axis forms a predetermined adjacent angle between 0 degree and 90 degree with respect to the upward axis. As a result of the predetermined adjacent angle, the front wheel axle and the front wheels are steered simply by applying force on the footboard to a side.

In another embodiment, the scooter further includes a steering member disposed at the front portion along the steering axis and operatively attached to the front wheel axle.

The steering member is configured to steer the front wheel axle when force is applied on the steering member.

Preferably, the scooter of an embodiment further includes a biasing device operable between a released condition and a distorted condition, and disposed at the front portion along the steeling axis and operatively attached to the front wheel axle. The biasing device is turned from the released condition to the distorted condition when force is applied to steer the front wheel axle, and returns to the released condition when the force applied to steer the front wheel axle is released.

An advantage of the present invention is that the user can steer the front wheels of the scooter without using his hands. The scooter can be steered by the user simply by shifting his weight (center of gravity) applying on the scooter.

BRIEF DESCRIPTION OF THE DRAWINGS

The above and other aspects, features, and advantages of the present invention will become more apparent upon consideration of the following detailed description of preferred embodiments, taken in conjunction with the accompanying figures, wherein.

DETAILED DESCRIPTION

Figure 1:
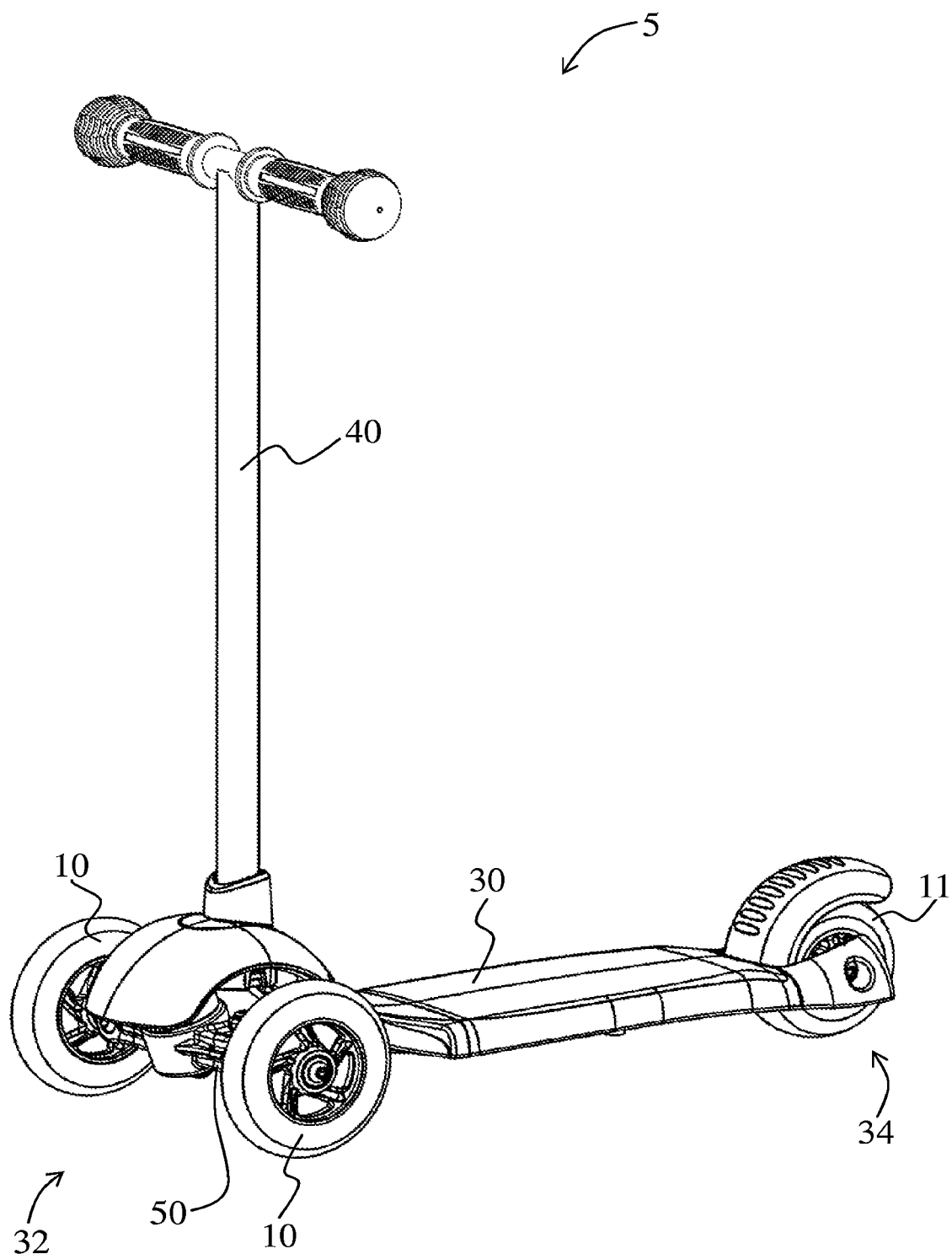
FIG. 1 is a perspective view of an embodiment of this invention.
Figure 2:
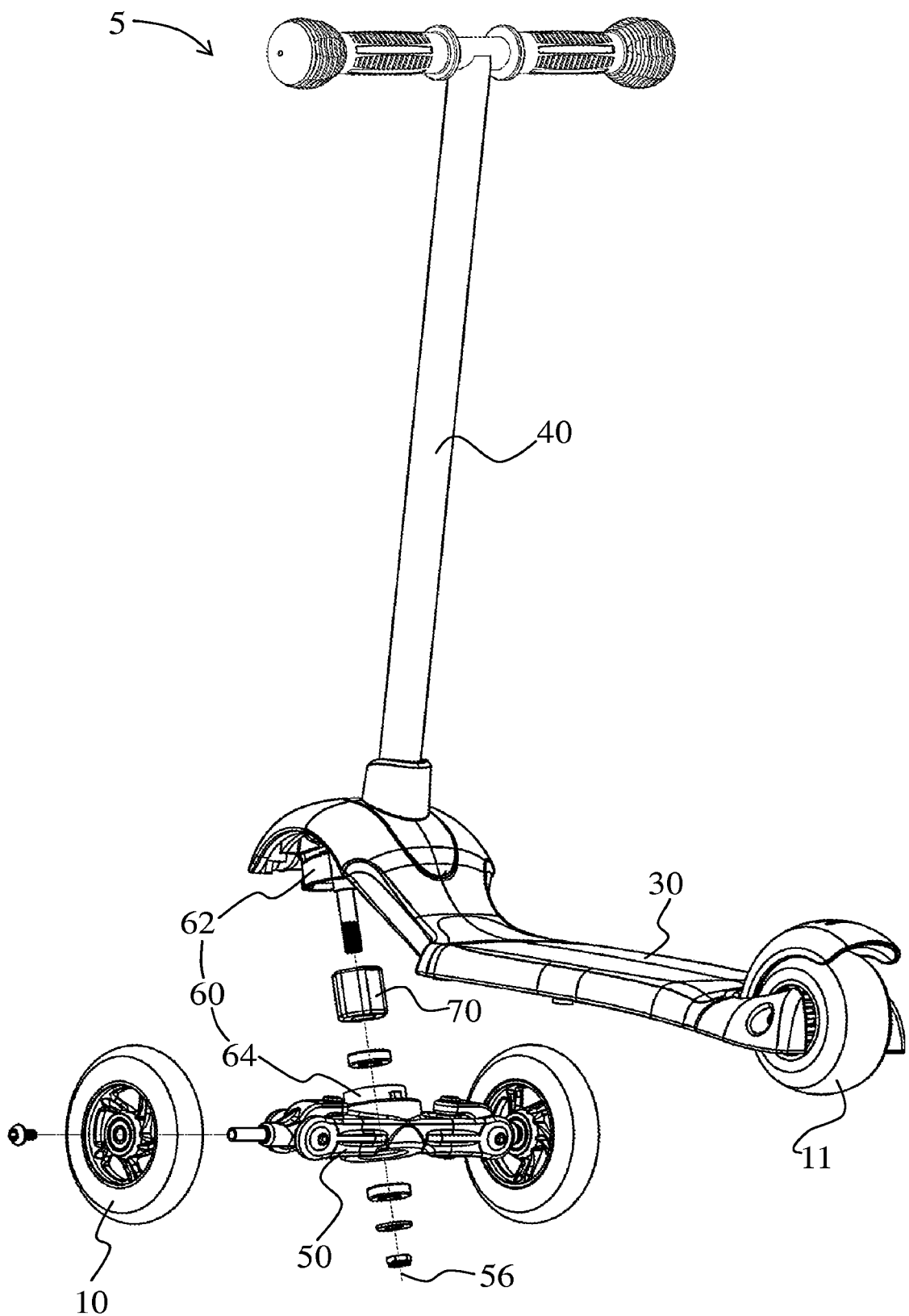
FIG. 2 is an exploded view of the foldable scooter in FIG. 1.

As shown in FIGS. 1 and 2, a preferred embodiment of the present invention is a scooter 5 including a footboard 30, a holding column 40, two front wheels 10 and a rear wheel 11. The front wheels and the rear wheel are attached to a front portion 32 and a rear portion 34 of the footboard respectively. The number of the front and rear wheels in this embodiment is just for example.

The front wheels 10 are attached to a front wheel axle 50. The front wheel axle has a pivot 51 and a steering axis 56 while the front wheel axle and the front wheels 10 are steered with respect to the pivot 51 and the steering axis 56. The steering axis 56 is inclined toward a front direction of the scooter 5, such that it forms a predetermined adjacent angle 53 with an upward axis 55 perpendicular with the front wheel axle.

The adjacent angle 53 is larger than 0 degree and smaller than 90 degree. Preferably, the adjacent angle is 20 degree, but the adjacent angle may be bigger or smaller than the example given herein.

A steering member 60 is disposed along the steering axis 56 on the front wheel axle 50 at one end for steering the front wheel axle to the same side when force is applied on the steering member on one side. The steering member is attached to the bottom of the front portion 32 of the footboard 30 at the other end. In this embodiment, the steering member 60 includes a first portion 62 attached to the base of the front portion 32 of the footboard 30, and a second portion 64 attached on the front wheel axle 50.

As an example, in this embodiment, the second portion 64 is attached at the pivot 51 of the front wheel axle 50 as an extension from the front wheel axle, but the second portion may be attached to the front wheel axle by other means or at other position.

The steering member 60 has to be attached to the front wheel axle such that when force is applied on the steering member, such force may be transferred to steer the front wheel axle.

When the scooter 5 is in a straight position, the user's weight distributes equally on both front wheels 10 and the balance of force prevents the front wheel axle 50 from rotating about the pivot 51 and the steering axis 56. The scooter will go in a straight course.

Figure 3:
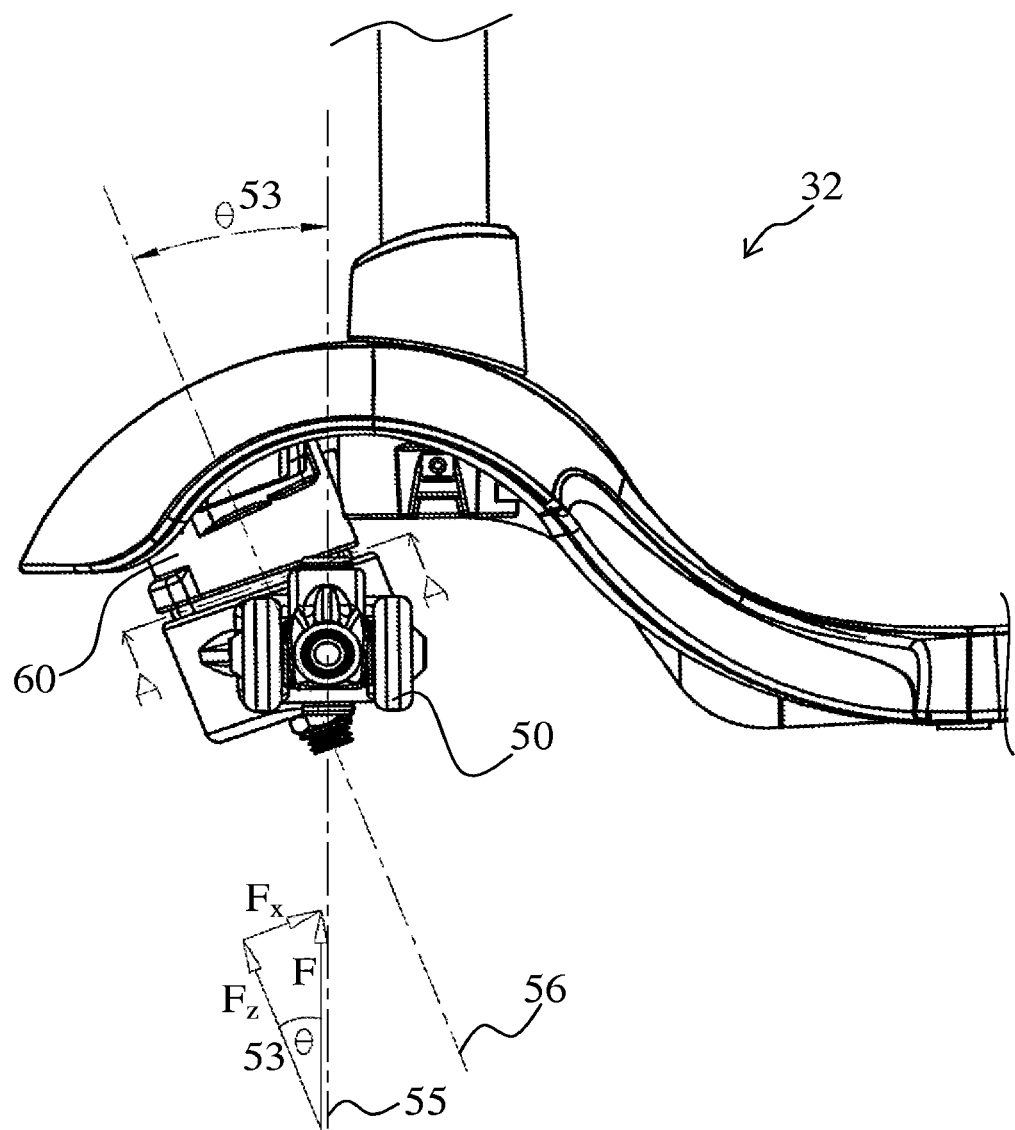
FIG. 3 is an illustrative side view of a front wheel axle and a steeling member of the scooter in FIG. 1.

For instance, when the user banks the scooter to the left side or shifts a portion of his weight to the left side, such force will pass from the footboard 30 and the holding column 40 on the steering member 60, and through the front wheel axle 50 on to the left front wheel 10. The left front wheel will be subject to an upward reaction force which acts in a direction opposite to the force from the steering member as shown in FIG. 3.

The steering member 60 is purportedly mounted in a way such that the steering axis 56 of the front wheel axle 50 is inclined at the predetermined adjacent angle 53 with respect to the upward axis 55. Due to the inclination of the steering axis 56, the components of the force F acting on the left front wheel 10 can be quantified as Fx and Fz as shown in FIG. 3. The force Fx causes rotational movement of the front wheel axle 50 at the pivot 51 with respect to the steeling axis 56.

Figure 4:
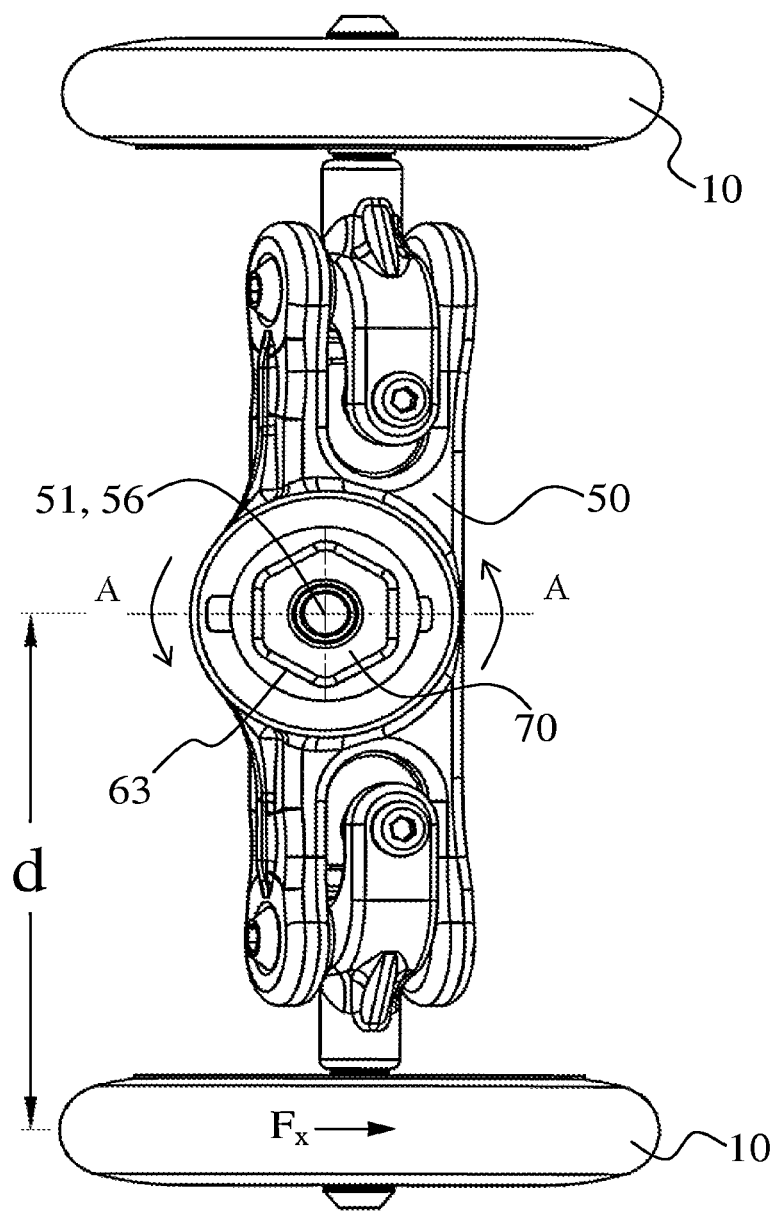
FIG. 4 is an illustrative plan view of a front wheel axle, a steering member and the front wheels of the scooter taken along the plane of A-A of FIG. 3.

FIG. 4 shows a view of the front wheel axle 50 and the front wheels 10 on a plane normal to the steering axis 56. The force Fx acts on the front wheel 10 with a perpendicular distance 'd' from the steeling axis and generates a moment about the steering axis, causing the front wheel axle to rotate about the steering axis and steer the front wheels accordingly.

The force Fx is resulted from the user's force and is substantially less than the force F generated by the user's initial effort of banking the scooter due to the adjacent angle 53 between the steering member (the steeling axis 56) and the upward axis 55. The adjacent angle is predetermined so that the generated Fx of the reaction force is sufficient to overcome the friction from the wheels and beatings and to initiate the rotation and steeling of the front wheel axle 50.

When the user shifts his weight or center of gravity to one side, the force will be applied from the footboard 30 on to the steeling member 60, causing the front wheel axle 50 to steer to the same side. As a result of the rotation of the front wheel axle 50 with respect to the inclined steeling axis 56, the footboard 30 will be allowed to bank downward toward the turning side.

Figures 5, 6:
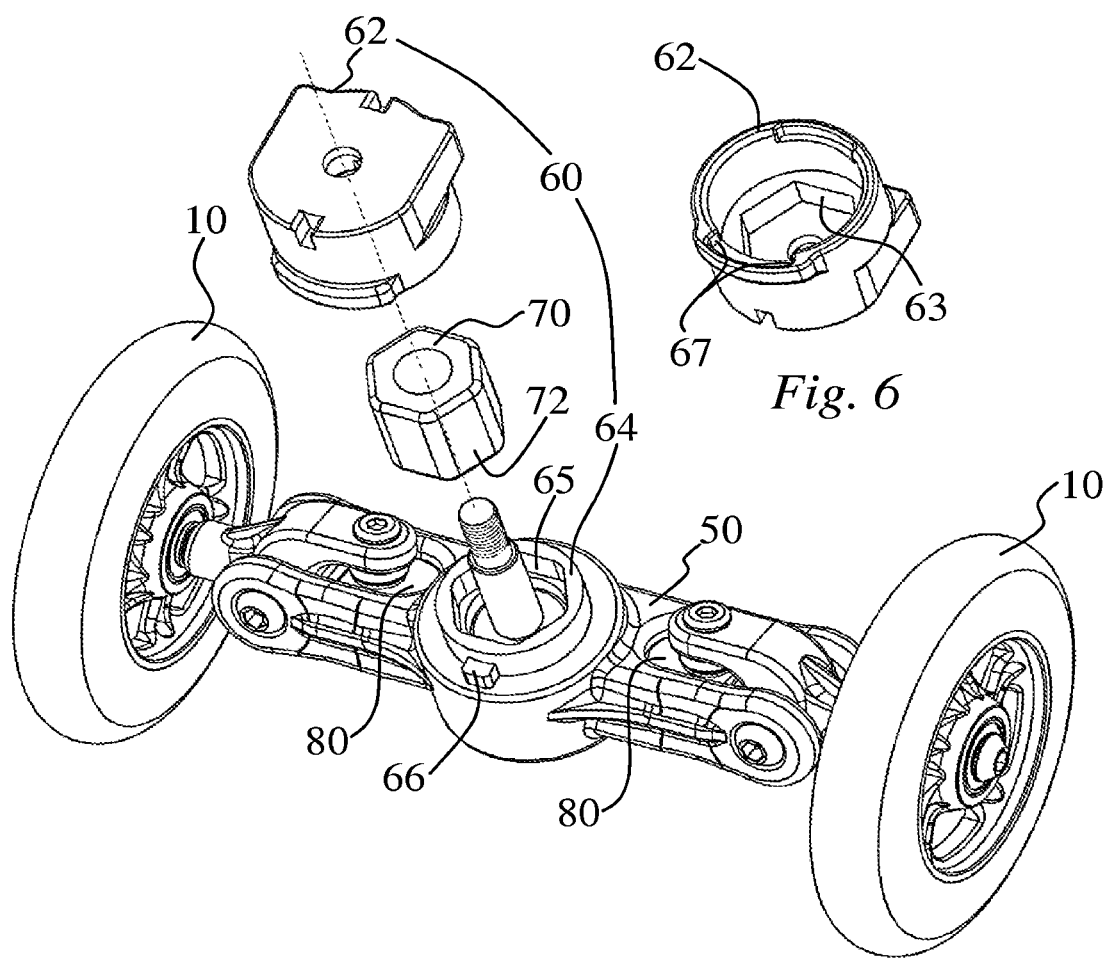
FIG. 5 is a perspective view of a front wheel axle, a steering member and a biasing device of the foldable scooter in FIG. 1.
FIG. 6 is a bottom perspective view of a first portion of the steering member of FIG. 5.

As shown in FIGS. 5 and 6, in this embodiment, each of the first portion 62 and the second portion 64 of the steering member 60 has a cavity for receiving a biasing device 70. The biasing device is operable between a released condition and a distorted condition. The biasing device is turned from the released condition to the distorted condition when force is applied on the steeling member to steer the front wheel axle 50, and returns to the released condition when the force applied on the steering member to steer the front wheel axle is released.

The biasing device 70, by a non-limiting example, may be an elastic member in a hexagonal cylindrical shape and made of silicon rubber. The biasing device 70, in this embodiment, has a circumferential surface 72 corresponding to a first inner surface 63 of the first portion 62 and a second inner surface 65 of the second portion 64. The corresponding circumferential surface and the internal surface cause the biasing device to be twisted with the second portion when the front wheel axle 50 is steered. The biasing device may be attached to the steeling member 60 by other means.

When force is applied by the user on the steeling member 60 to steer the front wheel axle 50, the biasing device 70 is twisted from the released condition to the distorted condition. When the user releases his force on the steering member 60 to steer the front wheel axle 50, the biasing device returns to the released condition, such that the front wheel axle is steered back and the front wheels 10 are returned to the straight position for the scooter 5 to go in a straight course. Without the assistance of the biasing device, the user has to solely use his own force to apply on the steering member to steer the front wheel axle and the front wheels back to the straight position.

The biasing device 70 may be in other form, for example a torsion spring, or attached to the steering member 60 by other means.

By a non-limiting example, a pair of protrusions 66 is formed on the outer surface 68 of the second portion 62 and stoppers 67 are formed on the first inner surface 63 of the first portion 62 to restrict the steeling of the front wheel axle 10 to a certain degree.

The holding column 40 is for the user to hold as a handle for better balance and is not for steeling the scooter. The scooter may therefore be operated with or without the holding column. Preferably the holding column 40 is tilted slightly backward to keep the center of gravity of the user and the scooter 5 near the center position of the scooter.

An elastic member 80 is disposed on each side of the front wheel axle 50 operatively attached to the front wheels 10 to absorb shock. The elastic member may be replaced by other biasing device to act as the shock absorber.

The embodiments described in this specification and the contents disclosed therein are provided by way of illustration only. The invention can be applied equally well on other types of scooter.

While the invention has been described in detail with reference to disclosed embodiments, various modifications within the scope of the invention will be apparent to those of ordinary skill in this technological field. It is to be appreciated that features described with respect to one embodiment typically may be applied to other embodiments.

The invention claimed is:

1. A scooter, comprising:
    a footboard having a front portion and a rear portion, the rear portion having a rear wheel attached thereto;
    a front wheel axle, wherein each end of the front wheel axle is operatively connected to a front wheel support through a front wheel elastic member, wherein each of the front wheel supports holds a front wheel;
    a holding column that is operatively connected to the front wheel axle, and is pivotable to pivot the front wheel axle about a steering axis; and
    a front wheel axle biasing device that is separate from the elastic member and that is positioned to bias the front wheel axle towards a position in which the front wheel axle is perpendicular to the footboard, wherein the front wheel axle biasing device is a monolithic member.

2. A scooter as claimed in claim 1, wherein each end of the front wheel axle includes a first U-shaped portion, and each front wheel support has a first end with a second U-shaped portion, wherein the first U-shaped portion has arms that pivotally connect with a base of the second U-shaped portion and the second U-shaped portion has arms that engage the front wheel elastic member.

3. A scooter as claimed in claim 2, wherein the arms of the second U-shaped portion extend, in use, generally horizontally, one vertically above the other, with the front wheel elastic member therebetween.

4. A scooter, comprising:
    a footboard having a front portion and a rear portion, the rear portion having a rear wheel attached thereto;
    a front wheel axle having a plurality of front wheels connected thereto;
    a holding column that is attached to the footboard and is operatively connected to the front wheel axle, and is pivotable to bank the footboard and to pivot the front wheel axle about a steering axis that is inclined towards a front direction of the scooter relative to an upward axis by an angle that is greater than 0 degrees and less than 90 degrees; and
    a front wheel axle biasing device that is positioned to bias the front wheel axle towards a position in which the front wheel axle is perpendicular to the footboard, wherein the front wheel axle biasing device is a monolithic block of material, wherein the front wheel axle biasing device has a plurality of planar faces that engage a plurality of planar surfaces associated with the front axle, and a plurality of planar surfaces associated with the footboard.

\* \* \* \* \*